United States Patent [19]

Becking

[11] 4,037,803

[45] July 26, 1977

[54] CENTER FEED UNWINDER

[75] Inventor: Paul E. Becking, San Mateo, Calif.

[73] Assignee: Data-Link Corporation, San Mateo, Calif.

[21] Appl. No.: 411,738

[22] Filed: Nov. 1, 1973

Related U.S. Application Data

[63] Continuation of Ser. No. 300,875, Oct. 25, 1972, abandoned, which is a continuation of Ser. No. 873,812, Nov. 4, 1969, abandoned.

[51] Int. Cl.² .................... G11B 23/00; B65H 25/22
[52] U.S. Cl. ............................... 242/55.18; 242/75.43
[58] Field of Search ............... 242/55.19 R, 55.18, 242/75.43; 352/128

[56] References Cited

U.S. PATENT DOCUMENTS

| 1,031,129 | 7/1912 | Lloyd | 242/55.18 |
| 1,075,487 | 10/1913 | Merkel | 242/55.18 |
| 1,132,369 | 3/1915 | Lytton | 242/55.18 |
| 1,751,192 | 3/1930 | Cowie | 242/55.18 |
| 1,944,039 | 1/1934 | Sweet | 242/75.43 X |
| 1,952,196 | 3/1934 | Coil | 242/75.43 |
| 2,107,074 | 2/1938 | Hineline | 242/75.43 UX |
| 3,424,390 | 1/1969 | Lyhus | 242/55.18 X |

FOREIGN PATENT DOCUMENTS

| 1,020,190 | 8/1952 | Germany | 242/55.19 A |

Primary Examiner—Billy S. Taylor
Attorney, Agent, or Firm—Ned L. Conley; David M. Ostfeld; Murray Robinson

[57] ABSTRACT

Tape unwinder wherein such tape is unwound from the center of a roll. A central cone portion includes area having a low coefficient of friction as well as other area having a high coefficient. A braking device is engageable with such unwinder on tension being relieved.

20 Claims, 7 Drawing Figures

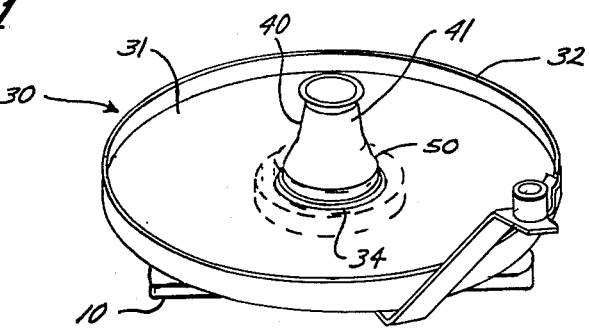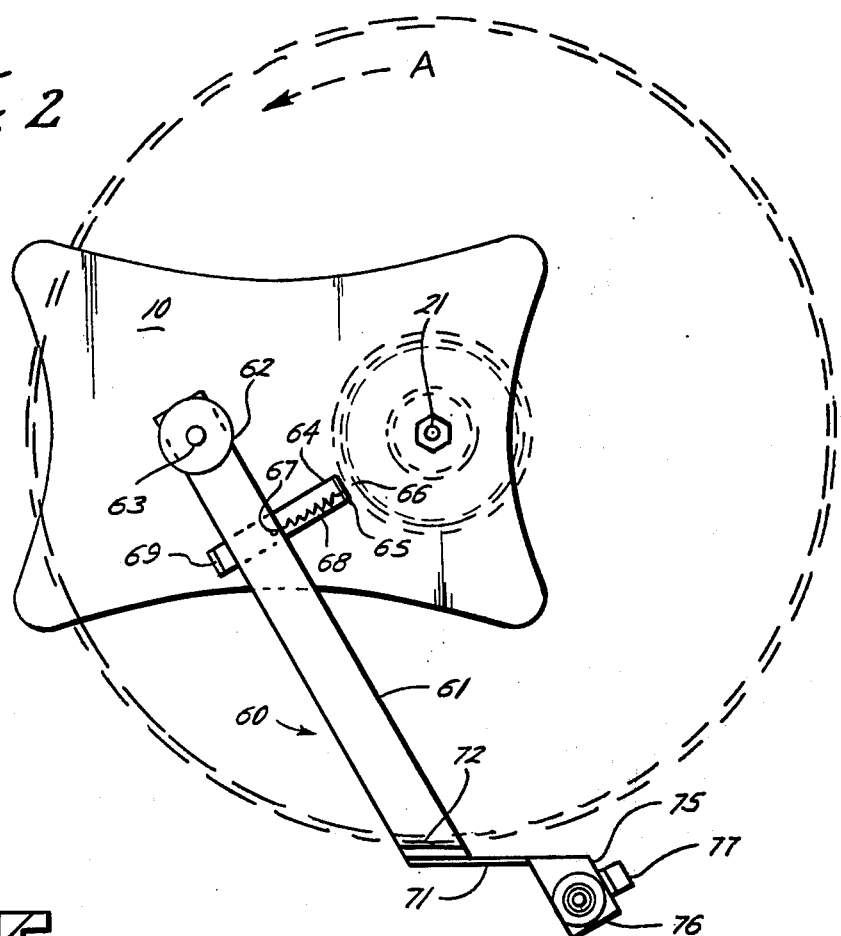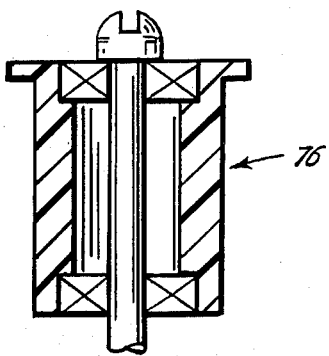

U.S. Patent   July 26, 1977   Sheet 2 of 3   4,037,803
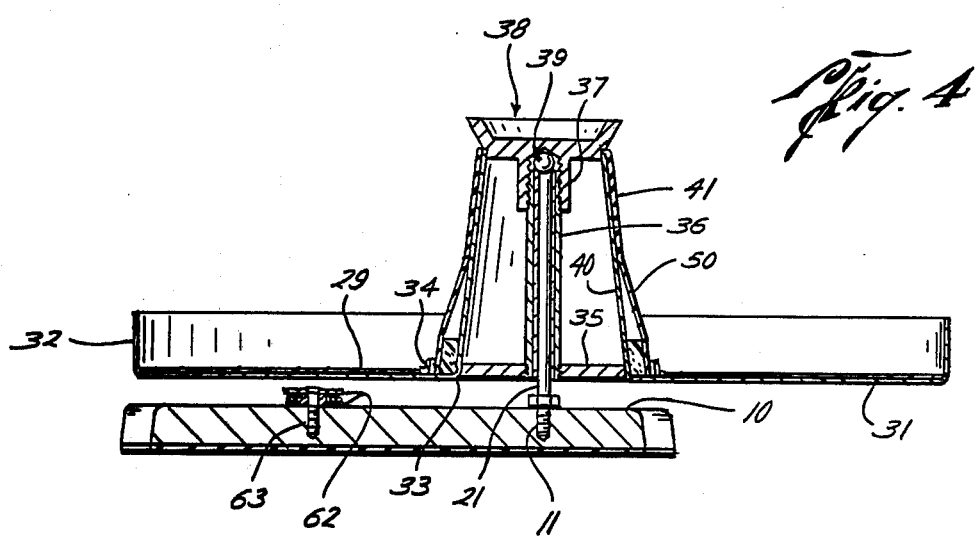
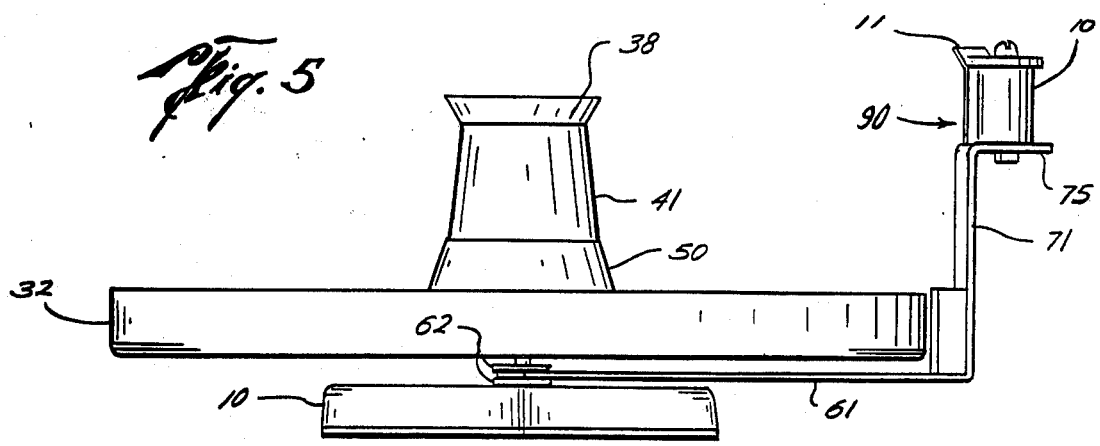

CENTER FEED UNWINDER

This is a continuation of application Ser. No. 300,875, filed Oct. 25, 1972, which is a continuation of application Ser. No. 873,812, filed Nov. 4, 1969, both now abandoned.

BACKGROUND OF THE INVENTION

Tape or ribbon unwinders are used to provide such tape, which oftentimes would be punched with coded information, to other instruments, such as a tape reader. In order to abrogate the necessity for rewinding operations, when such tape is to be reused, unwinders are used which permit the tape to be initially drawn from the radially innermost end, rather than from the outermost, thus the name center feed unwinder. Previously used devices have encountered difficulties such as adjacent lengths of the tape becoming bound or locked together or upon the structure of the unwinder. This has resulted in tape breakage, especially during high speed operation. Repair, as by splicing, is time consuming and may result in a loss of coded information. Braking devices have proved necessary in order to control tape rotation, and to prevent overrun. Prior attempts to solve such problems are exemplified in prior U.S. Pat. Nos. 1,393,985; 3,276,709; 1,751,192; 3,424,390; and 2,972,452.

SUMMARY OF THE INVENTION

This invention generally includes a rotating bowl having an upstanding cone centrally thereof. A boot of high friction material is provided at the upper portion of the cone, and a further member of low friction material provided at the lower portion thereof. These members tend to assure continuous exit of a single tape layer, and prevent binding of subsequent lengths. A braking lever is further provided which is normally held out of engagement by pressure exerted by the exiting tape. Removal of such pressure, as by tape breakage, will cause the brake to halt such bowl rotation. Idler rollers may also be provided.

DESCRIPTION OF THE DRAWINGS

FIG. 1 is a perspective of the unwinder,

FIG. 2 is a top plan of the base and braking lever, the outer bowl rim being shown in phantom lines;

FIG. 3 is a vertical section through one of the roller guides;

FIG. 4 is a vertical axial section through the bowl and base members;

FIG. 5 is a side elevation of one embodiment of the unwinder;

DESCRIPTION OF A PREFERRED EMBODIMENT

Figure 6:
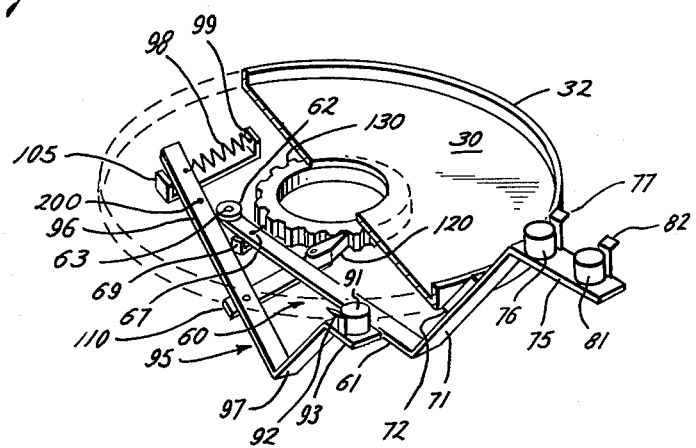
FIG. 6 is a perspective showing a modification of the invention, a part being broken away for clarity.

Looking at the drawings, a base plate 10 is shown, which may be generally rectangular in configuration. Felt, rubber, or like material may be affixed to the undersurface thereof to prevent scarring of the surface on which the unwinder rests, as well as to secure the unwinder thereto during operation.

Somewhat toward one end of the plate is threaded aperture 11 to receive the threaded lower end of post or spindle 21. Of course, other convenient means of fixing the two members together may be utilized. Positioned astride spindle 21, in a rotatable manner, is a bowl-like member, generally illustrated at 30 and best shown in FIGS. 1 and 4. Annular bottom 31 of the bowl terminates at its periphery in upstanding flange 32. The center of the bowl bottom is apertured at 33. Surrounding such aperture is relatively short upstanding annular ridge 34, fabricated from a material such as some plastic having a relatively low coefficient of friction. Centrally positioned cone 40 may have its lower end fixed with respect to aperture 33 in any conventional manner. In the embodiment shown herein, such cone may be welded or brazed to the bowl bottom, and the aperture 33 being convered by disc 35 fitted to the aperture. Such disc receives tube 36 which tube is flush with the disc bottom and extends upwardly toward the upper limit of cone 40. Tube 36 may be externally threaded, at its upper end, to mate with a female coupling extension 37 of cone cover 38. The means of joining cone 40 to bowl bottom 31, as mentioned, is not critical. For example, the cone may be fabricated as an integral upward extension of the bowl, and/or the spindle receiving tube may be so constructed as to be fixed within the interior of the cone and linked to the interior wall thereof by struts. It is also contemplated that ridge 34, central cone 40 and secondary cone 50 (later described) may be formed as a single, integral component, as by injection molding. Among other functions later described, such cone receives spindle 21, and may rotate therearound. A substantial portion of the upper outer surface of cone 40 is enveloped by boot 41, which is of a material having a relatively high coefficient of friction. Ball means 39 may be provided to reduce friction between the spindle and the cone cover. Intermediate 1] the juncture of cone 40 with bowl bottom 31, and 2] annular ridge 34, a secondary cone 50 is seen to be secured to both the interior of said ridge and to the exterior of primary cone 40. This secondary cone may be joined to both said ridge and primary cone by means of packing such as sponge rubber which may be comented to the adjacent members. Secondary cone 50 is seen to have a broader base than primary cone 40, and to close on such primary cone at approximately the midpoint of the primary cone. The above structure permits easy exiting of the innermost tape length because of the slight separation of the tape roll from the primary cone, by virtue of ridge 34, and by the low coefficient if friction possessed by the material of both ridge 34 and secondary cone 50. As the coil winds around the upper reaches of the primary cone, and specifically around boot 41, having a high coefficient of friction, such boot prevents slippage from occurring, and thus permits the desired acceleration of the bowl, especially during the initial stage of rotation. The presence of ridge 34 assists in exiting only one tape thickness at a time. Latex, or other high friction material, washer 29 covers the bottom of the bowl, and deters tape slippage or overrun when quick braking occurs.

Explanation of the brake mechanism will follow. First, it may be said that the material shown in solid lines in the drawings constitute the basic material of this embodiment. The phantom line additions may prove helpful or effective in certain high speed applications.

The braking lever is illustrated generally at 60. This member includes lever arm 61, which is pivotally connected to base member 10, by means off shaft or screw 63, washers 62 being provided to opposite sides of said lever arm 61. Plate 64 is fixed to base member, and has upstanding lug 65. Such lug is apertured at 66, as is lever arm 61 apertured at 67, to receive spring member 68. Additional lug 69 may serve as a stop member for lever arm 61. Lever 60 is bent, opposite its pivotal connection to base member 10, to form a crank portion 71. Brake shoe means 72, which may be of hard rubber, is bonded or otherwise fixed to the side of such crank portion, in a position to abut against the outer surface of bowl flange 32. Opposite the connection of crank portion 71 to lever arm 61, the lever 60 is further bent to form flat deck 75. Roller guide 76 is rotatably affixed to such deck. Plate guide 77 may also be fixed to the deck 75, with tape passing intermediate such roller and plate.

In operation, tape from a roll centered in bowl 10, would pass one layer at a time over ridge 34 and thereafter spiral about secondary cone 50 and thereafter about boot portion 41 of cone 40, to pass intermediate roller 76 and plate 77. Such tape would, of course, be pulled by an outside device (not shown) such as an electrically or manually operated winding mechanism. The tape would move in a direction generally shown by arrow 90, the bowl rotating as indicated by arrow A in FIG. 2. By virtue of this pulling force and friction generated between the tape and the unwinder, a force will be exerted against lever 60 in a direction against spring member 68, and tending to move brake shoe 72 away from rotatable bowl flange 32.

When the above mentioned pulling force ceases, such as on tape breakage, operation stoppage, or the like, the force of lever 60 against spring 68 is removed. Thus, the spring operation pulls lever 60, and particularly brake shoe 72, against bowl flange 32, stopping rotation. It should be specially noted that not only is the pivot point 63 of lever 60 removed from the center of rotation of bowl 30, but also that lever crank 71 is offset, so that a wedging action occurs between bowl flange 32 and brake shoe 72, i.e., as bowl 30 tends to continue its rotation (normally counter clockwise) friction between such flange and shoe tend to press such shoe more tightly against the bowl flange. In other words, the arcuate direction traversed by the brake shoe and its lever, tends to intersect the direction in which the bowl moves, or actually the line of movement of a point on the bowl flange's periphery. This results in an extremely effective and prompt braking action.

Figure 7:
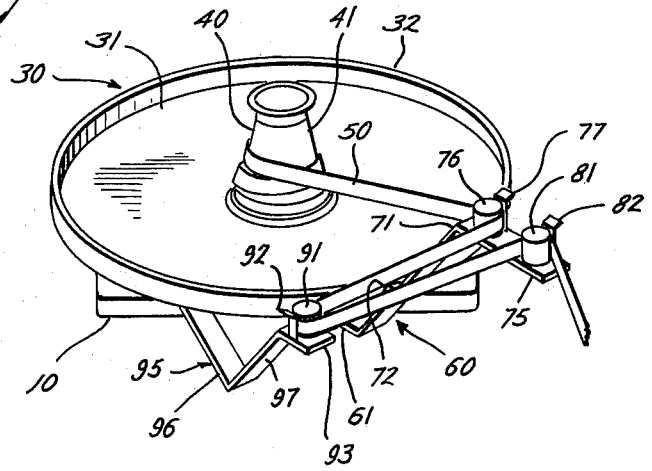
FIG. 7 is a perspective of the embodiment of FIG. 6, showing the tape in place.

The embodiment of the invention shown in FIGS. 6 and 7 also includes a tape storage means. It includes further roller 81 and plate guide 82 affixed to deck 75 of lever 60, as well as roller guide 91 and plate guide 92 affixed to a shorter deck 93 of further lever 95. Such further lever 95 may also have portion 96 pivotally connected to base 10, as indicated at 200, such portion and deck being linked by crank 97. This lever may be connected by spring 98 to a lug of plate 99, which plate is fixed to base 10. An additional lug 105 may be provided to the opposite end of plate 99 to function as a stop, in the same manner as lug 69 in FIG. 2. In this embodiment, tape would be wound as shown in FIG. 7. The added rollers would then function as a tape storage device, providing additional time prior to bowl acceleration. This has proved desirable in certain high speed operations. It will be seen that when a pull on the tape is initiated, the inertia of the unwinder bowl will resist rotation. This resistance will cause the tape to pull on roller 91, thereby pivoting lever 95 against the spring 98. This reduces the acceleration required of bowl 30, thereby reducing the starting load on the tape. FIG. 6 shows a further arm 110 pivotally attached to lever portion 96 and having pawl 120 attached to its end. This pawl may operatively engage the teeth of a ratchet 130 affixed to the underside of bowl 30. Thus, an initial tape unrolling lever 96 will be pivoted in the direction of intended bowl motion, i.e. counter clockwise in FIG. 7 and the pawl will cause such motion of bowl 30. This tends to positively speed up the starting cycle.

Thus, this device is shown to not only provide a new and effective braking device, but to reduce binding, slippage, and overrun of the tape itself, when stoppage occurs, during operation and when starting begins. These latter features are primarily due to the unique combination of low and high frictional surfaces within the tape storage bowl.

Although limited embodiments have been shown, the concept would give rise to numerous modifications, both of design and of material, without departing from the spirit of the invention, wherein

I claim:

1. Center feed tape unwinder comprising:
   a rotatable tape storage bowl; and
   a cone member extending outwardly at the center of said bowl, about which tape may spiral; said cone member including at least an upper and a lower inwardly and upwardly tapering conical portion with said upper conical portion having a surface with a substantially greater coefficient of friction with tape than the surface of said lower conical portion;
   said cone member further including a primary cone;
   said upper portion being a conical boot surrounding the upper part of said primary cone; and
   said lower portion being a secondary cone surrounding the lower part of said primary cone.

2. The unwinder as defined by claim 1 further comprising an exiting means having an annular upstanding ridge at the base of said secondary cone with said secondary cone being joined to said ridge and said primary cone by means of packing.

3. The unwinder as defined by claim 2 wherein said secondary cone joins the approximate mid point of said primary cone and joins the inner side of said annular ridge.

4. A center feed tape unwinder as defined by claim 1 including
   means outside said bowl for pulling tape from said upper conical portion whereby pulling of such tape causes rotation of said bowl,
   means for braking rotation of said bowl upon the break of said tape including a brake shoe means affixed to a first pivotable lever,
   pivot means offset from the center of rotation of said bowl for pivotally mounting said first level and the brake shoe means thereon for engagement with said bowl to provide wedging.

5. A center feed tape unwinder as defined by claim 4 wherein said braking means further includes stop means limiting the pivoting of said first lever.

6. A center feed tape unwinder as defined by claim 4 wherein said braking means further includes
   means for biasing said brake shoe means into engagement with said bowl upon the break of said tape.

7. A center feed tape unwinder as defined by claim 6 including
   a roller and tape guide affixed to the end of said first lever;
   said tape passing between said roller and said tape guide to apply a force to said roller and to rotate said first lever against the force of said biasing means.

8. A center feed tape unwinder as defined by claim 4 wherein said braking means further includes first guide means for positioning said tape.

9. An unwinder according to claim 8 further comprising:
a base to which said bowl is rotatably attached;
a second lever, pivotal with respect to said base; said second lever carrying a second guide means; and
a third guide means and said first guide means affixed to said first lever whereby said tape passes from said bowl to said first guide means around said second guide means and to said third guide means;
means for biasing said second lever in a direction opposite the force applied by said tape to said second guide means; and
means for limiting the pivot of said second lever both in the direction of the force applied by biasing means and of the force applied by said tape.

10. An unwinder according to claim 9 further comprising:
a ratchet affixed to said bowl; said second lever having a pawl engaging said ratchet upon the pivot of said second lever toward said bowl.

11. A center feed tape unwinder comprising:
a rotatable tape storage bowl having a substantially flat bottom which has a relatively high coefficient of friction with tape,
an annular upstanding ridge on the bottom of said bowl, a cone member extending upwardly from the center of the bottom of the bowl inside said annular ridge,
said cone member having upper and lower frusto-conical shaped portions, both of which taper inwardly toward the center and upwardly from the bottom of said bowl, the upper of said conical portions having a substantially higher coefficient of frictions with tape than the lower of said conical portions, whereby when tape is pulled from the center of a roll of tape lying in the bottom of the bowl it will slide over said ridge and said lower conical portion but will tend to be gripped by said upper conical portion so that pulling of such tape causes rotation of said bowl without slipping of the roll of tape on the bottom of the bowl, and means outside said bowl for pulling tape from said upper conical portion.

12. A center feed tape unwinder as defined by claim 11 wherein said means outside said bowl for pulling tape from said upper conical portion includes:
a pivotable brake arm, a bowl engageable brake shoe on said brake arm, and
means urging said brake arm to pivot in a direction to engage the brake shoe with said bowl to resist rotation thereof,
said brake arm being positioned to be engaged by said tape in a manner to pivot the brake arm to move the brake shoe out of engagement with said bowl when tape is being pulled from said bowl.

13. A center feed tape unwinder as defined by claim 11 wherein said means outside bowl for pulling tape from said upper conical portion includes:
means for limiting acceleration when pulling of tape is started.

14. In a tape unwinder including a rotatable container from which tape is unwound by pulling the tape therefrom in a manner to cause the rotation of said container, means for reducing the initial load on said tape required to start rotation of said container, comprising:
a guide means for tape leading from said container, said guide means being pivotable with respect to said container upon application of force to said tape to pull tape from the container, and
means on said guide means engageable with said container to impart a rotating torque to the container upon pivoting of the guide means.

15. A tape unwinder as defined by claim 14 wherein the means to impart a rotating torque comprises a ratchet on said container and a pawl on said guide means.

16. A center tape unwinder comprising:
rotatable tape storage bowl wherein said bowl is rotated by the unwinding of tape therefrom;
a base to which said bowl is rotatably attached;
a first lever pivotal with respect to said base; said first lever having a first guide means and a third guide means rotatably attached to one end; and
a second lever pivotal with respect to said base, and second lever having a second guide means rotatably attached to one end;
means for biasing said second lever in a direction opposite the force applied by said tape to said second guide means; and
means for limiting the pivot of said second lever both in the direction of the force applied by said biasing means and of the force applied by said tape;
said tape passing from said bowl to said first guide means and around said second guide means and then around to said third guide means whereby the initial force applied to unwind said tape is absorbed by pivoting of said second lever.

17. An unwinder according to claim 16 and further comprising:
means on said second lever engageable with said bowl, upon application of initial force to unwind tape, in a direction to impart rotation to said bowl in a tape-unwinding direction.

18. An unwinder according to claim 17 wherein the latter means comprises:
a ratchet affixed to said bowl; and
a pawl on said second lever engageable with said ratchet to rotate said bowl upon the pivot of said second lever by the force of unwinding tape.

19. A center feed tape unwinder comprising
a rotatable bowl for storing said tape wherein said bowl is rotated by the unwinding of tape therefrom;
a base to which said bowl is rotatably attached;
a first guide means and a third guide means rotatably mounted on said base;
a lever pivotally mounted on said base, said lever carrying a second guide means;
means limiting the pivot of said lever;
means biasing said lever in a direction opposite the force applied by said tape to said second guide means; and
a rachet affixed to said bowl; said lever having a pawl engageable with said ratchet upon the pivot of said lever toward said bowl.

20. A center feed unwinder as defined by claim 11 wherein said means outside said bowl for pulling tape from said upper conical portion includes
a pivotable brake lever having a brake shoe thereon engageable with a cylindrical braking surface on the container, said lever and shoe being pivotable in a plane substantially parallel to the plane of rotation of said container, and being pivotable about an axis offset from the center of rotation of said container and within the circle of said braking surface, means adapted to urge said lever to pivot in a direction to cause engagement of said brake shoe with said braking surface, and means on said lever engageable by said tape, while it is being pulled from the container, in a manner to prevent pivoting in said direction, whereby upon breaking of the tape the brake shoe engages said braking surface and the frictional engagement with the rotating container pulls the brake shoe into tighter engagement with the braking surface.

* * * * *